(12) United States Patent
Thoms

(10) Patent No.: US 6,969,228 B2
(45) Date of Patent: Nov. 29, 2005

(54) PALLETIZING SYSTEM FOR STORING AND TRANSPORTING MATERIALS

(75) Inventor: Craig M. Thoms, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 221 days.

(21) Appl. No.: 10/403,994

(22) Filed: Mar. 31, 2003

(65) Prior Publication Data

US 2004/0191048 A1    Sep. 30, 2004

(51) Int. Cl.[7] ...................... B65G 57/00; B65H 29/00; B65D 85/66; B65D 85/67; B65D 85/671
(52) U.S. Cl. ................... 414/789.5; 206/394; 206/512
(58) Field of Search ................ 414/789.5; 206/394, 206/391, 408, 509, 512

(56) References Cited

U.S. PATENT DOCUMENTS

| | | |
|---|---|---|
| 4,122,949 A | 10/1978 | Blatt |
| 4,228,744 A | 10/1980 | Moore |
| 4,570,546 A | 2/1986 | Batelka |
| 4,801,494 A | 1/1989 | Datta et al. |
| 4,890,973 A | 1/1990 | Frison et al. |
| 4,908,026 A | 3/1990 | Sukiennik et al. |
| 5,086,919 A | 2/1992 | Toral et al. |
| 5,111,754 A | 5/1992 | Adams, Jr. |
| 5,131,541 A | 7/1992 | Liebel |
| 5,163,556 A | 11/1992 | Akao et al. |
| 5,165,542 A | 11/1992 | Sommerfeldt et al. |
| 5,274,898 A | 1/1994 | Sovitch et al. |
| 5,287,816 A | 2/1994 | Jungpeter et al. |
| 5,344,014 A | 9/1994 | Toral et al. |
| 5,409,114 A | 4/1995 | Myers et al. |
| 5,415,289 A | 5/1995 | Kim |
| 5,450,961 A | 9/1995 | Gottfried et al. |
| 5,503,517 A | 4/1996 | Derby |
| 5,551,563 A | 9/1996 | Allen |
| 5,582,312 A | 12/1996 | Niles et al. |
| 5,613,447 A | 3/1997 | Trickett |
| 5,622,260 A | 4/1997 | Chamberlin et al. |
| 5,642,811 A | 7/1997 | Hübner et al. |
| 5,674,049 A | 10/1997 | Pienta et al. |
| 5,826,721 A | 10/1998 | Fujimoto et al. |
| 5,829,592 A | 11/1998 | Henry, Jr. et al. |
| 5,881,651 A | 3/1999 | Trickett |
| 5,984,153 A | 11/1999 | Richard |
| 6,029,582 A | 2/2000 | Ogilvie, Jr. et al. |
| 6,059,514 A | 5/2000 | Sanchez |
| 6,059,520 A | 5/2000 | Adams et al. |
| RE37,575 E | 3/2002 | Lambert |

*Primary Examiner*—Gene O. Crawford
(74) *Attorney, Agent, or Firm*—Dority & Manning, P.A.

(57) ABSTRACT

A palletizing system for stacking materials is provided. The system utilizes support members to minimize leaning of stacked materials. These support members are inserted through openings defined by one or more slip sheets. In particular, these openings are spaced about the perimeter of the slip sheet so that support members may be inserted therethrough. Thus, indentation or deformation of the outer edges of the materials is minimized.

31 Claims, 4 Drawing Sheets

PALLETIZING SYSTEM FOR STORING AND TRANSPORTING MATERIALS

BACKGROUND OF THE INVENTION

Various materials in the absorbent product industry, such as those used to form diapers, wipes, tissue, etc., are often stored in a rolled form on a pallet. The rolled materials are held in place on the pallet using a variety of techniques, such as boxing, banding, or blister packaging. However, conventional palletizing approaches result in a variety of problems. For example, when palletized materials are stacked one upon the next, there is a tendency for the stack to lean. Further, the runners of an upwardly-disposed pallet sometimes indent or distort the packaging of the materials. Nails utilized with wooden pallets may also damage the materials during handling.

In response to these and other problems, another form of palletizing, sometimes referred to as "slipsheet" palletizing", was developed. For instance, one example of such a slipsheet palletizing technique is described in U.S. Pat. No. 6,059,514 to Sanchez. With the "slipsheet" approach, materials are stacked on each other, but have a thin slipsheet positioned between adjacently stacked materials. A lifting device may be employed (herein referred to as a "upender") to manipulate the stacked materials. Despite its benefits, however, the "slipsheet palletizing" technique still possesses various problems, particularly for soft and flexible materials. For instance, when stacking multiple materials, the increased weight causes the entire stack to lean slightly. Even if the stack does not fall, the leaning imparts increased pressure to the outer edges of the materials. When the material is relatively soft and flexible, this increased pressure can cause the outer edges to be indented and deformed, which is obviously undesired. In many instances, these deformed materials must actually be discarded.

As such, a need currently exists for a system and method for more effectively stacking materials, particularly relatively soft and flexible absorbent materials.

SUMMARY OF THE INVENTION

In accordance with one embodiment of the present invention, a palletizing system is disclosed that comprises at least one slip sheet that has a load-bearing surface on which materials (e.g., rolled absorbent materials for use in an absorbent article) are capable of being stacked vertically. The slip-sheet defines two or more openings that are disposed about the outer perimeter thereof. The material, size, and shape of the slip sheet may generally vary as desired. For instance, the slip sheet may be formed from corrugated paper board, thermoplastic polymers, metals, or combinations thereof, and may be generally circular in shape. In some embodiments, the openings are disposed approximately equidistant about the perimeter of the slip sheet. If desired, the openings may be formed in tabs of the slip sheet that, in some instances, contain an outer edge that extends outwardly from the load bearing surface.

The system further comprises support members capable of being inserted through the openings of the slip sheet to inhibit leaning of materials stacked on the load-bearing surface. The support members may be formed from wood, metals, corrugated paper board, or combinations thereof. If desired, the support members may have a height that is approximately the same as the combined height of the materials to be stacked and the height of the slip sheet(s). The system may also comprise a support platform having an upper surface that carries the slip sheet and the materials to be stacked. The support members may rest on the upper surface of the support platform. In addition, the system may comprise a spacer sheet disposed on the upper surface of the support platform.

In accordance with another embodiment of the present invention, a slip sheet for use in a, palletizing system is disclosed. The slip sheet has a load-bearing surface on which materials are capable of being stacked vertically. The slip-sheet defines two or more openings that are disposed about the outer perimeter thereof, the openings being capable of insertion with support members that inhibit leaning of materials when stacked on the load-bearing surface.

In still another embodiment of the present invention, a method for stacking materials on a surface is disclosed. The method comprises positioning a first slip sheet over the surface, the slip sheet having a load-bearing surface and defining two or more openings that are disposed about the outer perimeter thereof. A material is stacked on the first slip sheet. A second slip sheet is positioned over the material, the second slip sheet defining two or more openings that are disposed about the outer perimeter thereof. The openings of the first slip sheet are aligned with the openings of the second slip sheet. Support members are inserted through the aligned openings of the first slip sheet and the second slip sheet to inhibit leaning of the stacked material. Optionally, a material is also stacked on the second slip sheet. In some embodiments, the surface over which the first slip sheet is positioned is defined by a support platform. In addition, a material to be stacked may be positioned between the first slip sheet and the surface over which said slip sheet is positioned.

Other features and aspects of the present invention are discussed in greater detail below.

BRIEF DESCRIPTION OF THE DRAWINGS

A full and enabling disclosure of the present invention, including the best mode thereof to one of ordinary skill in the art, is set forth more particularly in the remainder of the specification, including reference to the accompanying figures in which.

Figure 1:
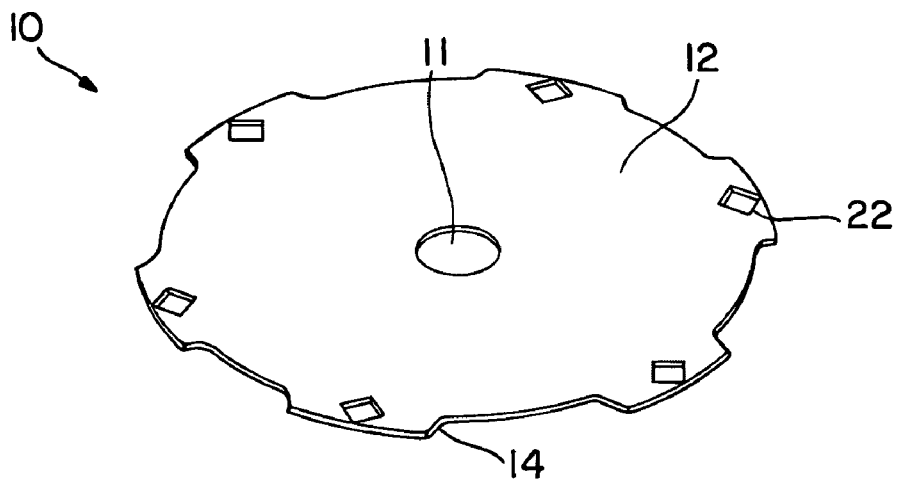
FIG. 1 is a perspective view of one embodiment of a slip sheet of the present invention.

Repeat use of reference characters in the present specification and drawings is intended to represent same or analogous features or elements of the present invention.

DETAILED DESCRIPTION OF REPRESENTATIVE EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention covers such modifications and variations as come within the scope of the appended claims and their equivalents.

In general, the present invention is directed to an improved palletizing system for stacking materials, particularly rolled absorbent materials. The system utilizes support members to minimize leaning of stacked materials. These support members are inserted through openings defined by one or more slip sheets. In particular, these openings are spaced about the perimeter of the slip sheet so that support members may be inserted therethrough. Thus, indentation or deformation of the outer edges of the materials is minimized.

Figure 2:
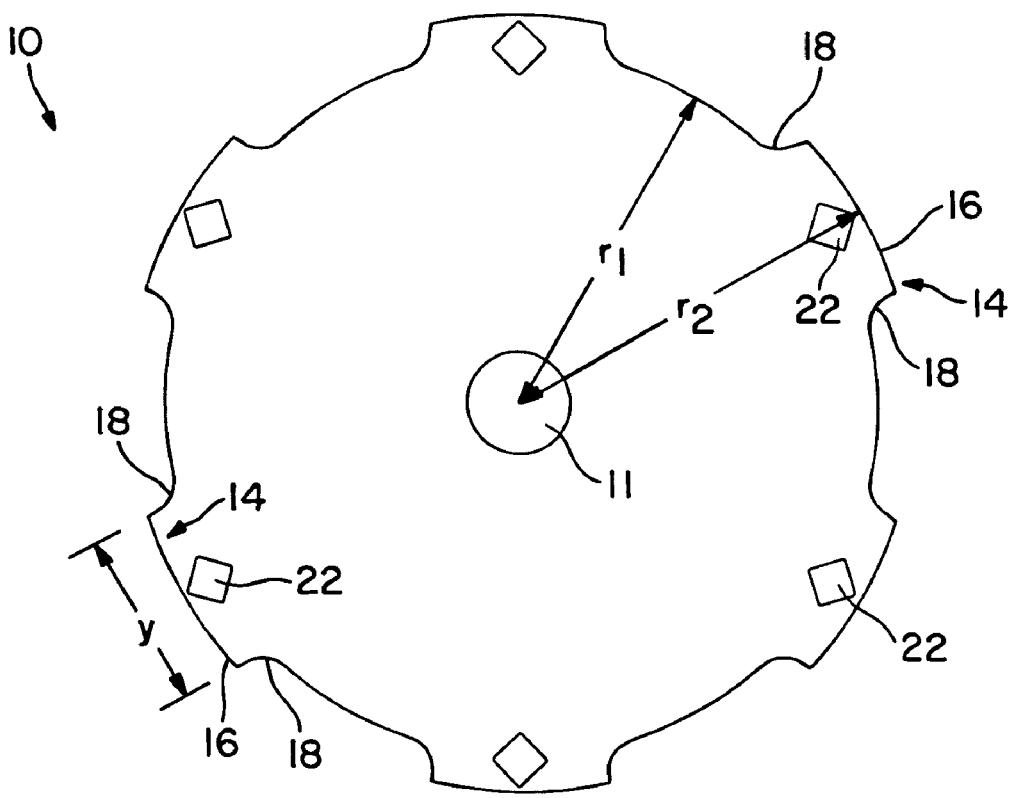
FIG. 2 is a top view of the slip sheet of FIG. 1.

Referring to FIGS. 1–2, for instance, one embodiment of a slip sheet 10 that may be used in the present invention is illustrated. The slip sheet 10 has a relatively small thickness so that it is essentially a two-dimensional body. For instance, the thickness may range from about 0.015 to about 0.080 inches, and in some embodiments, from about 0.040 to 0.060 inches. The slip sheet 10 may be formed from a variety of different materials, such as corrugated paper board, thermoplastic polymers, metals, and so forth. Some suitable thermoplastic polymeric materials that may be used include, but are not limited to, polyolefins, such as polyethylene, high density polyethylene ("HDPE"), and polypropylene; polyesters, such as poly(ethylene terephthalate); and so forth.

In the illustrated embodiment, the slip sheet 10 contains a load-bearing surface 12 on which materials may be stacked. The shape and size of the load-bearing surface 12 may vary depending on the type of materials it is configured to store or transport. For instance, in the embodiment illustrated in FIGS. 1–2, the load-bearing surface 12 is circular in shape, which may be particularly well-suited to support rolled absorbent materials (e.g., outer cover of diapers). Of course, the load-bearing surface 12 may also have any other shape desired, such as rectangular, triangular, square, and other regular or irregular shapes. Further, the size of the load-bearing surface 12 may also vary. In some embodiments, for instance, the load-bearing surface 12 may have a size (e.g., diameter) that is from about 10 to about 80 inches, in some embodiments from about 20 to about 70 inches, and in some embodiments from about 30 to about 55 inches. In one particular embodiment, the load-bearing surface 12 is circular and has a diameter, equal to twice the radius "$r_1$", of about 48 inches.

To facilitate the ability of the present invention to provide support to a stack of materials, the slip sheet 10 includes various openings through which support members may be inserted. For instance, in the embodiment illustrated in FIGS. 1–2, the slip sheet 10 defines a central opening 11 through which a center support member may be inserted. This opening 11 is particularly useful when stacking rolled materials that have an empty core, such as rolls of materials used to form the outer covers of diapers. The size and shape of the central opening 11 may vary. For example, the central opening 11 may have a shape that is circular, rectangular, triangular, square, as well as any other regular or irregular shape. In addition, the size of the central opening 11 may range from about 1 inch to about 20 inches, in some embodiments from about 2 inches to about 15 inches, and in some embodiments, from about 5 inches to about 10 inches. In the illustrated embodiment, for instance, the central opening 11 is circular in shape and has a diameter of about 6.75 inches.

Besides a central opening 11, the slip sheet 10 may also define openings 22 through which outer support members may be inserted. Although not required, the openings 22 are generally spaced approximately equidistant about the outer perimeter of the load-bearing surface 12 to minimize leaning. Two (2) or more openings 22 are generally utilized, and preferably at least three (3). In the illustrated embodiment, for instance, six (6) openings 22 are utilized. The size and shape of the openings 22 is not critical. For example, the openings 22 may have a shape that is circular, rectangular, triangular, square, as well as any other regular or irregular shape. In addition, the size of the openings 22 may range from about 0.5 inches to about 10 inches, in some embodiments from about 1 inch to about 5 inches, and in some embodiments, from about 2 inches to about 4 inches. In the illustrated embodiment, for instance, the openings 22 are square in shape and have a size (i.e., width) of about 2.5 inches.

The openings 22 may be formed in the slip sheet 10 in a variety of ways. For example, in the embodiment illustrated in FIG. 1, the openings 22 are formed in tabs 14 that are spaced approximately equidistant about the slip sheet 10. Each tab 14 may contain a single opening 22, as shown in FIGS. 1–2, or may contain multiple openings. It should be understood that the load-bearing surface 12 and tabs 14 may be separate or continuous.

The size and shape of the tabs 14 may generally vary, so long as they extend at least some distance beyond the outer perimeter of the load-bearing surface 12. In the illustrated embodiment, for instance, the tabs 14 have a generally rectangular shape. However, other shapes, such as square, trapezoidal, circular, oval, etc., may also be used. In this manner, when materials are stacked onto the surface 12, the tabs 14 will remain uncovered and free for insertion with support members. For example, in the illustrated embodiment, the tabs 14 have a generally rectangular shape with curved edges 16 and 18. In some embodiments, the diameter of the curved outer edges 16, which is equal to twice the radius "$r_2$", may range from about from about 10 to about 80 inches, in some embodiments from about 20 to about 70 inches, and in some embodiments, from about 30 to about 55 inches. Typically, the distance that the curved edges 16 of the tabs 14 extend from the outer perimeter of the load-bearing surface 14, i.e., $r_2-r_1$, is from about 0.5 to about 5 inches, in some embodiments from about 0.5 to about 3 inches, and in some embodiments, from about 1.5 to about 2.5 inches. In one particular embodiment, the load-bearing surface 12 has a diameter of about 48 inches and the curved outer edges 16 have a diameter of about 52 inches, which results an extension distance of about 2 inches. In addition, the width "y" of the outer edge 16 may be from about 2 to about 20 inches, in some embodiments from about 5 to about 15 inches, and in some embodiments, from about 8 to about 12 inches. In one particular embodiment, for instance, the width "y" is about 11.75 inches. Likewise, the curved edges 18 may have a radius of from about 0.5 to about 10 inches, in some embodiments from about 1 to about 5 inches, and in some embodiments, from about 2 to about 3 inches. In one particular embodiment, the radius of the curved edges 18 is about 2.5 inches.

Figure 3:
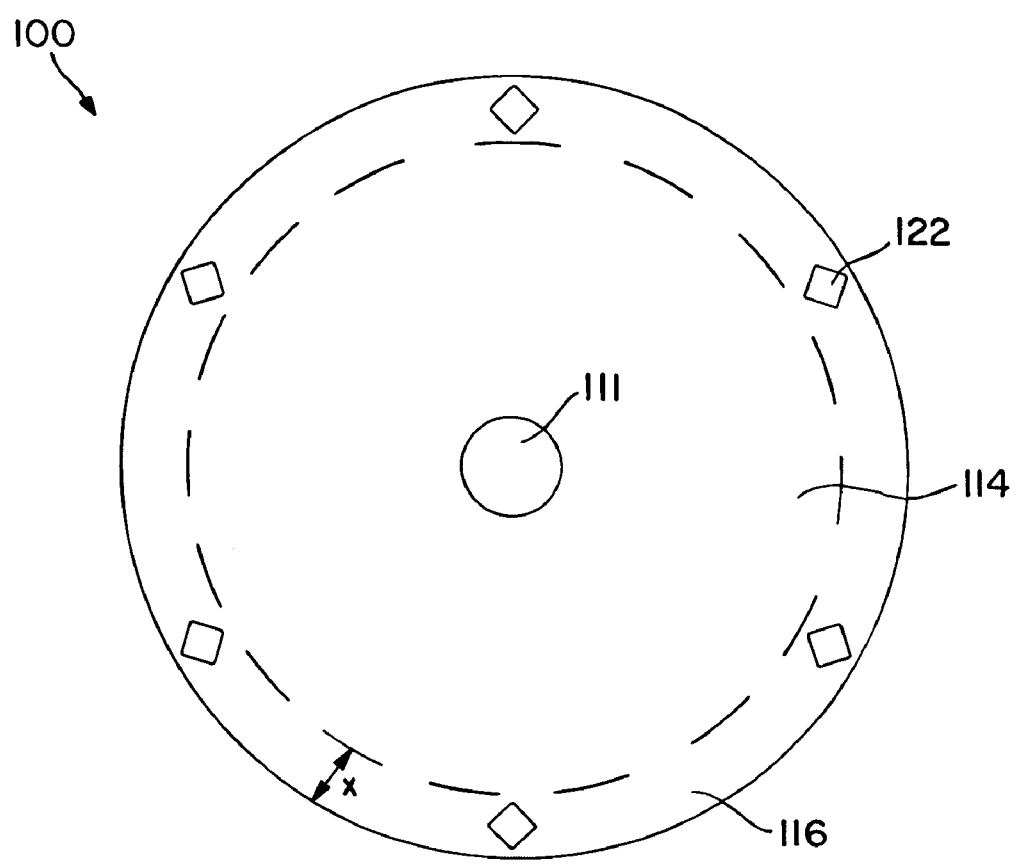
FIG. 3 is a top view of another embodiment of a slip sheet of the present invention.

Referring to FIG. 3, another embodiment of a slip sheet 100 having a load-surface 114 and a central opening 111 is shown. Instead of tabs, the slip sheet 100 includes an outer perimeter region 116 that defines openings 122 spaced approximately equidistant about the perimeter of the slip sheet 100. It should be understood that the load-bearing surface 114 and the region 116 and may be separate or continuous, and that the broken lines shown in FIG. 3 are for illustrative purposes only. As with the embodiment of the slip sheet shown in FIGS. 1–2, the outer perimeter region 116 extends beyond the load-bearing surface 114 a distance "x", such as from about 0.5 to about 5 inches, in some embodiments from about 0.5 to about 3 inches, and in some embodiments, from about 1.5 to about 2.5 inches. In this manner, the openings 122 may be capable of communicating with support members when a load is placed on the load-bearing surface 114.

Figure 4:
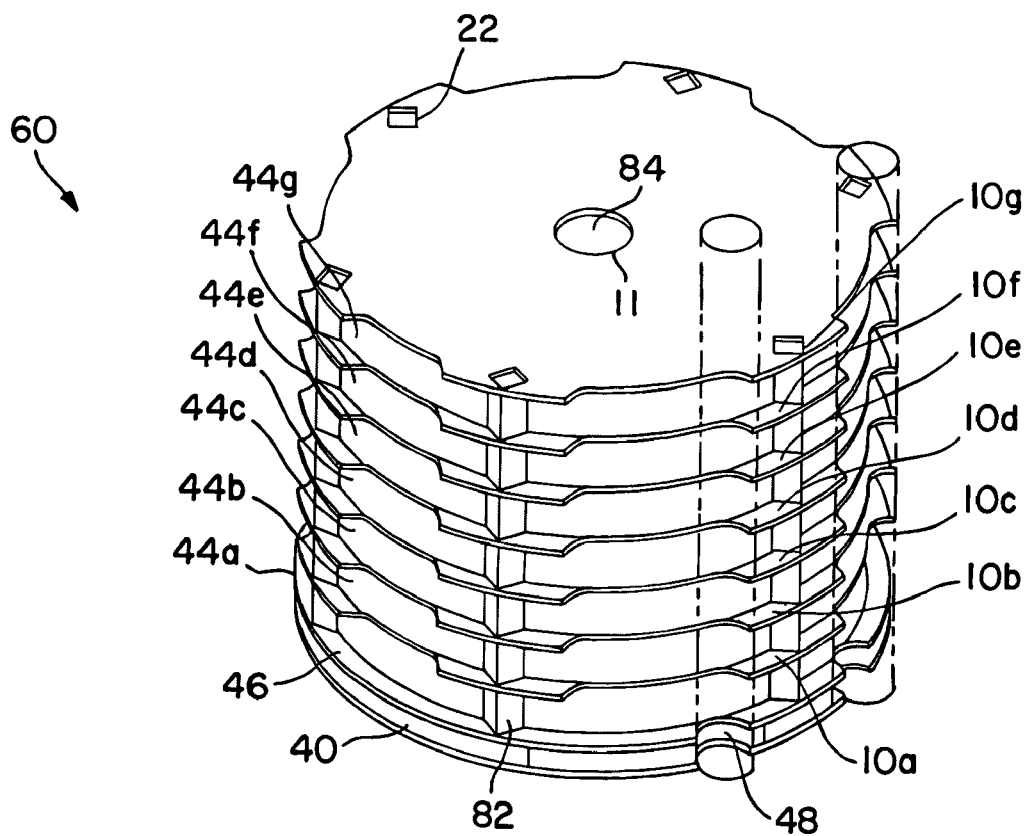
FIG. 4 is a perspective view of one embodiment of a stacking system that incorporates slip sheets in accordance with the present invention.
Figure 5:
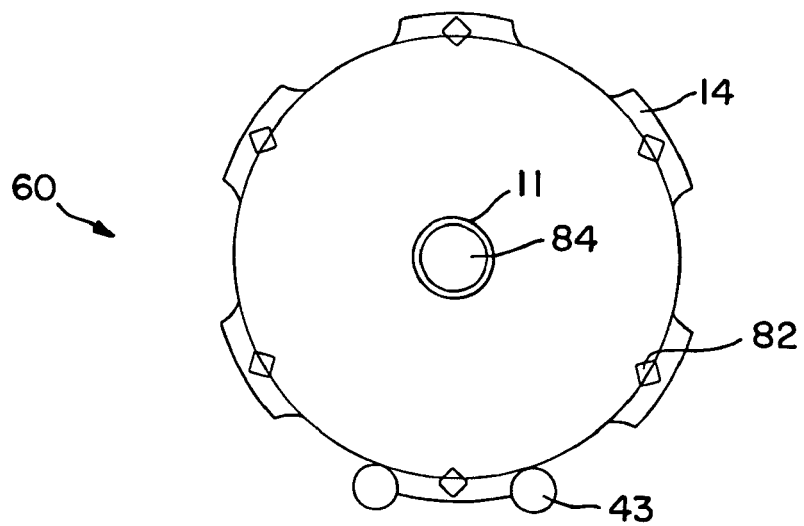
FIG. 5 is a top view of the stacking system of FIG. 4, shown with upender fingers positioned adjacent to the stack.

The slip sheets of the present invention may be incorporated into any of a variety of well-known palletizing systems. For instance, referring to FIGS. 4–5, one embodiment of a palletizing system 60 for stacking rolled materials that employs the slip sheet of FIG. 1 is illustrated. Initially, a shipping platform 40, such as a corrugated pallet, is provided. Although not required, the shipping platform 40 can provide additional support during handling and transportation of the stacked material. The shipping platform 40 may be provided with curved notches 48 to accommodate the fingers 43 of an upender (not shown).

Figure 6:
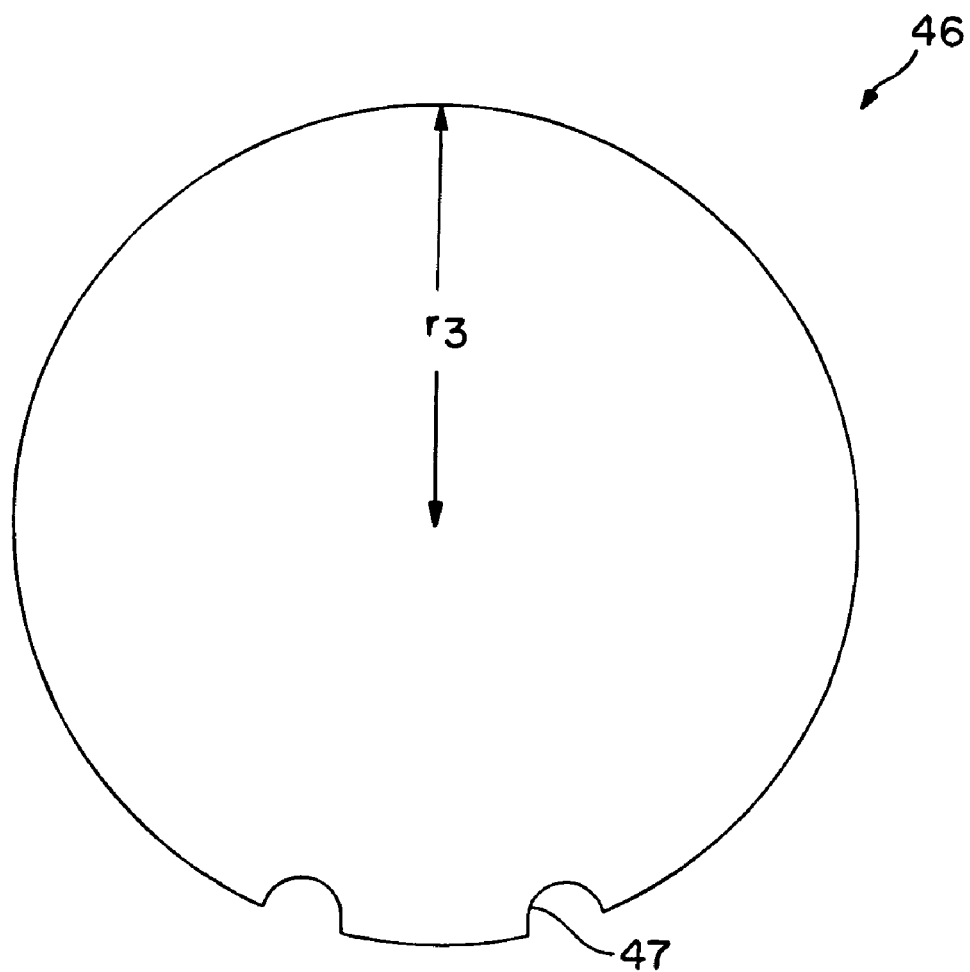
FIG. 6 is a top view of a spacer sheet that may be utilized in one embodiment of the present invention.

Further, one or more spacer sheets 46 may optionally be positioned on the platform 40 and attached thereto, such as by using glue. The spacer sheet 46 may serve as the loading target and support for a load, and may protect the load from upender fingers as they enter channels defined by the shipping platform 40. The spacer sheet 46 may have any size or shape desired, and may be formed from any material. For instance, the spacer sheet 46 may be formed from a material similar to that of a slip sheet. Likewise, the spacer sheet 46 may also have a shape and size that approximately corresponds to a slip sheet. For example, referring to FIG. 6, one embodiment of the spacer sheet 46 is shown that has a diameter (equal to twice the radius "$r_3$") of about 52 inches, which corresponds to the diameter of the outer edges 16 of the tabs 14 (See FIG. 1). Further, the spacer sheet 46 may also have curved notches 47 that correspond to the curved notches 48 of the platform 40.

Referring again to FIGS. 4–5, to form a stack, a first rolled material 44a may be directly positioned on the shipping platform 40 or optionally on the spacer sheet 46. After positioning the first rolled material 44a on the shipping platform 40, a first slip sheet 10a is positioned thereon. Thereafter, a second rolled material 44b is positioned on the first slip sheet 10a, and a second slip sheet 10b is positioned on the second rolled material 44b. The process of alternating the rolled materials and slip sheets may continue until the desired stack height is achieved. For instance, in the illustrated embodiment, the stack contains additional slip sheets 10c–10g that alternate between rolled materials 44c–44g. It should be understood, however, that the slip sheet 10 may be first positioned on the shipping platform 40 or spacer sheet 46, and the first rolled material 44a stacked thereon.

Regardless of the method used to stack the rolled materials 44a–44g, it is typically desired that the slip sheets 10a–10g be oriented in such a manner that their outer openings 22 are placed in alignment. In this manner, support members (e.g., posts, beams, etc.) may be inserted through the openings 22 and central opening 11 of each respective slip sheet in a substantially vertical position. The present inventor has discovered that positioning support members in this manner can substantially decrease the likelihood that the stack will lean, thereby decreasing any deformation of the rolled materials during shipping.

The support members may be formed from any material desired, such as metals, wood, corrugated paper board, and so forth. For instance, in the illustrated embodiment, corrugated corner posts 82 are positioned through the openings 22 of the slip sheets 10a–10g. In addition, a corrugated center post 84 is also positioned through the central opening 11 of the sheets 10a–10g and the stacked materials 44a–44g. Desirably, the posts 82 and/or 84 extend the entire length of the stack, i.e., the combined length of the stacked materials 44a–44g and the slip sheets 10a–10g. In some embodiments, for example, the posts 82 and 84 may have a height from about 20 to about 100 inches, in some embodiments from about 20 to about 60 inches, and in some embodiments, from about 30 to about 50 inches. Of course, the height of the posts 82 and 84 may vary depending on the nature of the materials to be stacked and any limitations on height that result from the mode of shipping utilized.

To enhance the support provided, the posts 82 and/or 84 are generally disposed so as to rest on the shipping platform 40. Alternatively, the shipping platform 40 may possess slots (not shown) through which the posts 82 and/or 84 may be inserted. In such embodiments, the posts 82 and/or 84 may rest on the floor for further support.

Once formed, the stack may be maneuvered by any conventional apparatus known in the art. For example, in some embodiments, an "upender" is used to palletize the materials. Automated upenders typically include a pair of moveable fingers. The fingers are initially placed in a horizontal position and moved forward to engage channels of the shipping platform. Thereafter, the fingers pivot to a vertical position so that the entire stack of materials, including the shipping platform, is lifted for loading onto a shipping truck or for other reasons. In addition, the upender may also be used to place one or more additional stacks on top of the first stack of rolled materials. Various other suitable upenders and techniques for moving stacks of materials may be described in U.S. Pat. No. 5,674,049 to Pienta, et al. and U.S. Pat. No. 6,059,520 to Adams, et al., which are incorporated herein in their entirety by reference thereto for all purposes.

The present invention can generally be utilized to stack various types of materials for storage and/or transportation. For example, the present invention is particularly well-suited to store and transport rolls of absorbent material used in the formation of absorbent articles. As used herein, the term "absorbent article" refers to any article capable of absorbing water or other fluids. Examples of some absorbent articles include, but are not limited to, personal care absorbent articles, such as diapers, training pants, absorbent underpants, adult incontinence products, feminine hygiene products (e.g., sanitary napkins), and the like; wound coverings; wipers; bed pads; shoe pads; clothing articles, such as perspiration pads, disposable swimming apparel, and the like; air and water filtration devices; and the like. Materials and processes suitable for forming such absorbent articles are well known to those skilled in the art.

For instance, the present invention may be used to store and transport cover layers of diapers or sanitary napkins that are configured to quickly absorb fluids and wick them towards the inner layers of the article. Such cover layers are generally designed to contact the body of the user and are liquid-permeable. For example, some suitable materials that can be used as a cover layer include nonwoven materials, perforated thermoplastic films, or combinations thereof. A nonwoven fabric made from polyester, polyethylene, polypropylene, bicomponent, nylon, rayon, or like fibers may be utilized. For instance, a white uniform spunbond material is particularly desirable because the color exhibits good masking properties to hide menses that has passed through it. U.S. Pat. No. 4,801,494 to Datta, et al. and U.S. Pat. No. 4,908 026 to Sukiennik, et al. teach various other cover materials that can be used in the present invention.

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A palletizing system comprising:
    at least one slip sheet that has a load-bearing surface on which materials are capable of being stacked vertically, said slip-sheet defining two or more openings that are disposed about the outer perimeter thereof, wherein said at least two openings are located outside of the perimeter defined by said load-bearing surface; and
    support members capable of being inserted through said openings to inhibit leaning of the materials stacked on said load-bearing surface.

2. A palletizing system as defined in claim 1, wherein said slip sheet is formed from corrugated paper board, thermoplastic polymers, metals, or combinations thereof.

3. A palletizing system as defined in claim 1, wherein said slip sheet is generally circular in shape.

4. A palletizing system as defined in claim 1, wherein said slip sheet further defines a central opening.

5. A palletizing system as defined in claim 1, wherein said support members are formed from wood, metals, corrugated paper board, or combinations thereof.

6. A palletizing system as defined in claim 1, wherein said support members have a height that is approximately the same as the combined height of the materials to be stacked and the height of said at least one slip sheet.

7. A palletizing system as defined in claim 1, wherein said materials to be stacked are rolled absorbent materials for use in an absorbent article.

8. A palletizing system as defined in claim 1, wherein said openings are disposed approximately equidistant about the perimeter of said slip sheet.

9. A palletizing system as defined in claim 8, wherein said slip sheet defines at least three openings.

10. A palletizing system as defined in claim 1, wherein said slip sheet contains tabs in which said openings are defined.

11. A palletizing system as defined in claim 10, wherein said tabs contain an outer edge that extends outwardly from said load bearing surface.

12. A palletizing system as defined in claim 1, further comprising a support platform having an upper surface that carries said slip sheet and said materials to be stacked.

13. A palletizing system as defined in claim 12, further comprising a spacer sheet disposed on said upper surface of said support platform.

14. A palletizing system as defined in claim 12, wherein said support members rest on said upper surface of said support platform.

15. A slip sheet for use in a palletizing system, said slip sheet having a load-bearing surface on which materials are capable of being stacked vertically, said slip-sheet defining two or more openings that are disposed about the outer perimeter thereof, said openings being capable of insertion with support members that inhibit leaning of materials when stacked on said load-bearing surface, wherein said two or more openings are located outside of the perimeter defined by said load-bearing surface.

16. A slip sheet as defined in claim 15, wherein the slip sheet is formed from corrugated paper board, thermoplastic polymers, metals, or combinations thereof.

17. A slip sheet as defined in claim 15, wherein the slip sheet is generally circular in shape.

18. A slip sheet as defined in claim 15, wherein the slip sheet further defines a central opening.

19. A slip sheet as defined in claim 15, wherein said openings are disposed approximately equidistant about the perimeter of the slip sheet.

20. A slip sheet as defined in claim 19, wherein the slip sheet defines at least three openings.

21. A slip sheet as defined in claim 15, wherein the slip sheet contains tabs in which said openings are defined.

22. A slip sheet as defined in claim 21, wherein said tabs contain an outer edge that extends outwardly from said load bearing surface.

23. A method for stacking materials on a surface, said method comprising:
    positioning a first slip sheet over the surface, said slip sheet having a load-bearing surface and defining two or more openings that are disposed about the outer perimeter thereof and are located outside of the perimeter defined by said load-bearing surface;
    stacking a material on said first slip sheet;
    positioning a second slip sheet over said material, said second slip sheet defining two or more openings that are disposed about the outer perimeter thereof;
    aligning the openings of said first slip sheet with the openings of said second slip sheet; and
    inserting support members through said aligned openings of said first slip sheet and said second slip sheet to inhibit leaning of the stacked material.

24. A method as defined in claim 23, wherein said slip sheet is generally circular in shape.

25. A method as defined in claim 23, wherein said openings of said first slip sheet and said second slip sheet are disposed approximately equidistant about the perimeter thereof.

26. A method as defined in claim 23, wherein said surface over which said first slip sheet is positioned is defined by a support platform.

27. A method as defined in claim 23, wherein a material to be stacked is positioned between said first slip sheet and said surface over which said slip sheet is positioned.

28. A method as defined in claim 23, further comprising stacking a material on said second slip sheet.

29. A method as defined in claim 23, wherein said stacked material is a rolled absorbent material for use in an absorbent article.

30. A method as defined in claim 23, wherein said first slip sheet and said second slip sheet further define central openings.

31. A method as defined in claim 30, further comprising inserting a support member through said central openings of said first slip sheet and said second slip sheet.

* * * * *